United States Patent [19]

Hoorne et al.

[11] Patent Number: 5,750,513
[45] Date of Patent: May 12, 1998

[54] HYDROCARBYL POLYSACCHARIDE COMPOSITIONS

[75] Inventors: Dirk Hoorne, Mechlin; Mahroussa Auda, Sint-Denijs-Westrem, both of Belgium

[73] Assignee: Imperial Chemical Industries PLC, Great Britain

[21] Appl. No.: 475,311

[22] Filed: Jun. 7, 1995

[51] Int. Cl.[6] .................................................. A61K 31/70
[52] U.S. Cl. ................................................ 514/54; 252/314
[58] Field of Search .................................. 514/54; 252/314

[56] References Cited

U.S. PATENT DOCUMENTS

| | | | |
|---|---|---|---|
| 5,177,066 | 1/1993 | Shimohiro et al. | 514/54 |
| 5,268,126 | 12/1993 | Balzer | 252/312 |
| 5,310,783 | 5/1994 | Bernheim et al. | 524/837 |
| 5,374,361 | 12/1994 | Chan | 507/211 |
| 5,409,628 | 4/1995 | Heinz et al. | 252/174.17 |

FOREIGN PATENT DOCUMENTS

| | | |
|---|---|---|
| A 0 396 044 | 11/1990 | European Pat. Off. . |
| A 0 432 836 | 6/1991 | European Pat. Off. . |
| WO A 91 03538 | 3/1991 | WIPO . |
| WO A 92 14031 | 8/1992 | WIPO . |

*Primary Examiner*—Elli Peselev

[57] ABSTRACT

A composition comprising a solution which comprises a hydrocarbyl polysaccharide, a non-ionic surfactant and an antifoam component, which antifoam component forms a separate phase on dilution with water, thereby reducing the foam which would normally arise from the hydrocarbyl polysaccharides, which is especially useful when it is necessary to spray the composition. The composition is useful as an adjuvant for example in agrochemical formulation, for example growth regulators, herbicides, and especially pesticides (such as insecticides, fungicides or acaricides), or as in the cleaning of hard surfaces, for example bottles. A concentrate and a corresponding dilute formulation e.g. for such purposes, in which an appropriate chemical agent is present, and processes for preparing and using the composition, concentrate and dilute formulation.

26 Claims, No Drawings

HYDROCARBYL POLYSACCHARIDE COMPOSITIONS

This invention relates to low foam hydrocarbyl polysaccharide compositions and a process for their preparation. It also relates to the use of such compositions in applications where formulations including such materials in general are prone to foaming and especially when it is necessary to spray such formulations which are in general prone to foaming, for example their use as adjuvants in agrochemical formulations, for example of growth regulators, herbicides, insecticides fungicides or acaricides or as agents for the cleaning of hard surfaces, for example in bottle washing and metal working and/or degreasing. It further relates to formulations of which such low foam polyglycoside compositions form a component and a process for their preparation, and a process for the application of such formulations, especially by spraying.

Hydrocarbyl polysaccharides (HPSs) are known surfactants which can be made from renewable resources and have attractive properties, for example in agrochemical formulations, especially pesticides. They are also useful in the cleaning of hard surfaces, for example bottle washing. Unfortunately they are in general prone to foaming and this represents a limitation on their usefulness in many applications.

Materials are known which suppress foaming in various systems. Such materials in general depend for their effectiveness on forming a separate phase from the foaming substance.

It is desirable to be able to formulate the hydrocarbyl, particularly alkyl polyglycosides as homogenous liquid compositions, because if phase separation occurs the user will dispense a non-optimum composition if he uses only part of the contents of a container of the composition unless he stirs or shakes the composition before dispersing it.

This invention provides a composition which is a homogenous solution which comprises (a) a hydrocarbyl polysaccharide;

(b) an anti foam component comprising a siloxane antifoam agent;

(c) another non-ionic surfactant which is preferably at least one compound of the formula $$R^1O(X)R^2 \text{ and/or } R^3—N(—XH)_2$$

in which $R^1$ is an alkyl group having 9 to 18 carbon atoms, an alkyl phenol group having 6 to 12 carbon atoms in its alkyl group, a sorbitan group or a group of formula $R^4CO$ in which $R^4$ is an alkyl group having 11 to 22 carbon atoms.

$R^2$ is hydrogen or an alkyl group, a carboxyalkyl group or a salt thereof, or a fatty acid residue having 10 to 22 carbon atoms, X is a polyalkylene oxide group containing an average of 2 to 40 alkylene oxide groups or mixed polyalkylene oxide groups, and $R^3$ is an alkyl or alkenyl group having 10 to 22 carbon atoms; and (d) a solvent for the HPS, which is preferably water;
such that the antifoam component (b) forms a separate phase on dilution with water.

The formation of a separate phase by the antifoam component comprising the siloxane antifoam agent on dilution with water reduces the foam which would normally arise from the HPS, which is especially useful when it is necessary to spray the solution.

The HPS may be a monoglycoside or a polyglycoside or mixture thereof. The glycoside is typically a least one compound of the formula $$ROG_a$$

where

R is a hydrophobic moiety;

G is a saccharide residue; and a is an average value which is at least 1.

The group R may be an optionally substituted hydrocarbyl group.

More specifically, the group R can be an alkyl, cycloalkyl, aryl, alkaryl, aralkyl or alkenyl group and is preferably an alkyl group. The group R suitably contains from 4 to 30 carbon atoms, preferably up to 24 carbon atoms, more preferably from 6 to 18 carbon atoms and especially from 8 to 14 carbon atoms.

Thus, R can be a mixture of alkyl or alkoxy groups which contain, on average, for example 8 to 14 carbon atoms.

The saccharide residue G may be derived from one or more of fructose, glucose, mannose, galactose, telose, gulose, allose, altrose, idose, arabinose, xylose, lyxose and ribose or from mixtures thereof. The group G is conveniently derived from glucose units and the glycoside is then a glucoside. If derived from sucrose the groups will comprise fructose and glucose residues.

The value of a is the degree of polymerization of the HPS. It is typically at least 1.1, preferably at least 1.2 and especially at least 1.3. The value of a is typically not greater than 8, and preferably not greater than 4, for example not greater than 2.

When the glycoside is an alkyl glucoside, the value of a is conveniently between 1 and 2.

We have obtained useful results when the glycoside is an alkyl glucoside of the general formula:

$$C_nH_{2n+1}O(C_6H_{10}O_5)_bH$$

where n has the value of 8 to 14, and b has the value of greater than one and not more than two.

The glucoside may be one in which the average value of n is from 9 to 13 and particularly is about 10.

The value of b is typically at least 1.3 and not more than 1.9.

A particularly useful material of this type is one in which n is from 8 to 11 and has an average value of 10 and b is about 1.35.

Hydrocarbyl glycosides are commercially available materials designated for example as APG 225 and APG 300 by Henkel or as sold under the trade name Triton BG 10 by Rohm & Haas.

Polysiloxane antifoams are typically of formula $$R^a{}_3SiO[SiO\ R^a R^{aa}]_nSi\ R^a{}_3$$

in which the groups $R^a$ are individually alkyl groups, preferably having 1 to 3 carbons atoms and are preferably methyl groups, and one or more of the groups $R^{aa}$ may be residues of polyalkylene glycols and the others are as defined for $R^a$, desirably the index n' is such that the polysiloxane has a molecular weight in the range 1000 to 20000 and preferably 5000 to 15000.

Examples of suitable polysiloxane antifoams are disclosed in British Patents 1553610 and 1554736.

Preferred non-ionic surfactants of the formula

$R^1O(X)R^2$ and/or $R^3$—N(—XH)$_2$ include those in which $R^1$ is an alkyl group having 12 to 15 carbon atoms, or a sorbitan group, $R^2$ is hydrogen, an alkyl group having 1 to 4 carbon atoms, or a carboxymethyl group or a salt thereof, or a fatty acid residue having 10 to 22 carbon atoms, X is a polyalkylene oxide group (for example a polyethylene or polypropylene oxide group) containing an average of 3 to 30 alkylene oxide groups or mixed polyalkylene oxide groups (for example mixed polyethylene or polypropylene oxide groups) containing 2 to 25, and more preferably 3 to 20 alkylene oxide groups, and $R^3$ is an alkyl or alkenyl group having 16 to 18 carbon atoms.

Examples of preferred $R^2$ include e.g. lauroyl and oleoyl.

Examples of preferred non-ionic surfactants thus include poly(alkoxylated) fatty acids and alcohols having 8 to 24, preferably 12 to 18 carbon atoms in their fatty acid or alcohol groups:

poly(alkoxylated) sorbitan and sorbitol esters, e.g. sorbitan mono-laurate and -oleate; and poly(alkoxylated) tallow amine; and combinations of two or more such compounds.

The ratio of component (a) to component (c) is preferably 20:1 to 1 to 3 by weight and more preferably 20:1 to 1:1 by weight.

The quantity of component (b) should be sufficient to secure an adequate anti-foaming effect for the intended use of the composition without the formation of a separate phase by the antifoam component in the absence of dilution of the composition with water. The antifoam component comprising a siloxane antifoam (b) is normally 0.1 to 10% and preferably 0.2 to 6% by weight of the total components (a) and (c).

In general the solvent component (d) will be an aqueous solvent i.e. water or water-miscible and/or soluble liquids so that it does not form a separate phase on dilution of the composition with water (unlike the antifoam component). Water is the preferred solvent.

It will be present in an amount sufficient to dissolve the HPS; if desired further water may be present, but in an amount insufficient to cause phase separation of the antifoam, for example in an amount by weight equal to 25% to 100% and preferably 30 to 60% of the weight of the other three components.

Compositions according to this invention may also incorporate other components. These include non-surfactant materials which are conventionally useful in surfactant formulations, such as viscosity modifiers, stabilisers and anti-microbials, further described hereinafter:

non-aqueous materials used conventionally in the formulation of compositions for use in agrochemical applications, which may be, for example hydrocarbon oils, for example $C_6$ to $C_{20}$ paraffins or optionally hydrogenated vegetable oils, such as an optionally hydrogenated cotton seed oil, linseed oil, mustard oil, neem oil, niger seed oil, oiticica oil, olive oil, palm oil, palm kernel oil, peanut oil, perilla oil, poppy seed oil, rape seed oil, safflower oil, sesame oil, or soybean oil; or esters (especially a $C_{1-6}$ ester of a $C_{8-22}$ fatty acid; and other surfactant materials which are conventionally useful in such formulations, such as poly(alkoxylated) mono-, di- and triglycerides, including poly(alkoxylated) vegetable oils, such as poly(ethoxylated) mustard oil, neem oil, niger seed oil, oiticica oil, palm oil, palm kernel oil, peanut oil, safflower oil, sesame oil, soybean oil, and especially castor oil.

These may typically be present as up to 25%, e.g. up to 10% by weight of the composition without affecting the formation of a separate phase by the antifoam component, but in most applications preferably form not more than 4, for example not more than 2 wt. %.

In addition to their use as adjuvants in agrochemical formulations, the compositions according to the invention are useful as agents for cleaning hard surfaces.

They are especially useful when it is necessary to spray hard surfaces, to clean them, with aqueous cleaning solutions which may for example also comprise alkalis or other builders.

The composition to which the first aspect of this invention relates may be produced by conventional mixing of the components in any order used conventionally in the formulation of such compositions for use in the applications hereinbefore described; for example their use as adjuvants in agrochemical formulations which may be concentrates or corresponding dilute formulations.

In a second aspect the present invention thus provides a process of making the composition by mixing the components together.

According to a third aspect of the invention there is provided a dispersible and/or soluble concentrate comprising at least one composition of the present invention of the type hereinbefore described; and (e) at least one chemical agent with activity specific to the intended use of the concentrate or a corresponding dilute formulation.

Such chemical agent specific to the intended use of the concentrate or corresponding dilute formulation may be for example an agrochemical or a metal corrosion inhibitor.

The concentrate of the third aspect of the present invention is often formulated to be subjected to dilution with water for use in the desired application, for example use as an agrochemical formulation.

In such dilution, water will be added to the concentrate in an amount sufficient to cause phase separation of the antifoam component comprising a siloxane antifoam (b) from that comprising components (a) and (c) diluted with water.

If an agrochemical is present it is typically one or more growth regulators, herbicides, and/or pesticides, for example insecticides, fungicides or acaricides.

Such concentrates may comprise a second chemical agent which will give a concentrate or corresponding dilute formulation in which the activity of the first chemical agent is made more specific to or selective in the intended use of the concentrate or corresponding dilute formulation.

Such concentrates typically include e.g. concentrates in which the first chemical agent is an agrochemical which is one or more pesticides, such as insecticides, fungicides or acaricides, and the second is a phytotoxicity inhibitor, to regulate any herbicidal activity of the concentrate or corresponding dilute formulation, or to make it more selective, e.g. as between graminious and broad-leaved species.

Such a second chemical agent may be present as up to 10 wt. % of the total concentrate.

The concentrates according to the invention are also useful as agents for cleaning hard surfaces, e.g. in metal working and/or degreasing. They are especially useful when it is necessary to spray hard surfaces, to clean them, with aqueous cleaning solutions which may for example also comprise alkalis or other builders.

Preferred dispersible and/or soluble concentrates of this third aspect are those comprising at least one composition of the present invention of which the components are described hereinbefore as preferred.

Other possible additives in the dispersible and/or soluble concentrate to which this invention relates include non-surfactant materials which are conventionally useful in surfactant formulations, such as viscosity modifiers, stabilisers, and anti-microbials.

One class of known viscosity modifier materials of this type includes one or more commercially available water-soluble or -miscible materials such as gums, e.g. xanthan gums, and/or cellulosics, e.g. carboxy-methyl, ethyl or propylcellulose.

These are often present, when used e.g. in agrochemical formulations in particular as 0.01 to 5 wt. % of the total concentrate.

The dispersible and/or soluble concentrates to which this invention relates may be produced by conventional mixing of the components in any order used conventionally.

In a fourth aspect the present invention thus provides a process of making the concentrate by mixing the components together.

This may be effected for example by adding the components (a) and (e), and any optional other additives, and stirring until the product is homogeneous.

For some dispersible and/or soluble concentrates to which this invention relates, mixing the components in a specific order may be necessary or e.g. may be desirable if the viscosity of the composition would otherwise be inconveniently high.

Such dispersible and/or soluble concentrates may have to be produced by conventional mixing of the components of the solvent (d), if necessary to form a first liquid phase, and dispersion of the specific chemical agent(s) (e) for the intended use of the concentrate or corresponding formulations together with the remaining components, including surfactant (c) to give a second separate liquid phase. This is effected with stirring until each phase is homogeneous.

The concentrate is made by careful dispersion of the second phase into the first phase.

It may be desirable that this is effected for example by adding the phases at moderately elevated temperatures with high shear mixing to deal with the inconveniently high viscosity of the concentrate which is thereby introduced.

The product concentrated dispersion is subsequently left to cool to ambient temperature.

Some dispersible and/or soluble concentrates may have to be produced by separate spraying of one or more solid components of the concentrate, e.g. the specific chemical agent(s) (e) onto a carrier to give a solid phase, followed by dispersion of the carrier together with the remaining components.

In some applications, the concentrates of the third aspect of the invention will suitably be supplied to the customer as such and converted to a more dilute form at the point of use in such applications.

In other applications, the relevant chemical agent is supplied to the customer, optionally with at least one organic solvent but separate from the remaining components of the concentrate in a second separate phase, and conversion to a dilute formulation, e.g. for application in the agrochemical industry, is effected by dilution of the two sets of materials, with stirring, followed by mixing of the corresponding diluted materials to effect dispersion of the agent in the formulations for application.

In general such diluted aqueous formulations contain for example 0.5 to 4% of the HPS.

Good stability in storage of the concentrated materials in either form as supplied before being converted to a more dilute form at the point of use is required.

In a fifth aspect the present invention provides a formulation which is a mixture of the components (a) to (d) and optionally (e) of the concentrate according to the third aspect of the present invention with 10 to 10,000 times the total weight of the components (a) to (d) of water, e.g. with 30 to 1,000 times the total weight of the components.

This formulation according to the invention may of course comprise other components and additives.

Suitable and preferred such components and additives are as so described hereinbefore with regard to the compositions, e.g. miscible materials such as solvents, stabilisers, and anti-microbials, which may be designated as components (f).

As noted above, the formulation may be made up in various ways, by for example (i) mixing the components (a) to (f) as appropriate to form the concentrate and then diluting the concentrate by mixing it with water to form the formulation; or (ii) mixing component (a) with an optional selection of materials from (b), (c), (d) and (f) to form a concentrate and diluting the concentrate with water to form a corresponding first dilute mixture, as appropriate mixing the component(s) (e) and diluting the mixture of these components with water to form a second dilute mixture, and/or mixing the first and second dilute mixtures to form the desired formulation according to a fifth aspect of the present invention.

Such a process for preparing the formulation according to the fifth aspect of the present invention forms a sixth aspect of the invention.

In a seventh aspect the present invention also provides a method of using a composition of the first aspect of this invention, a concentrate of the third aspect of the present invention, or a dilute formulation according to the fifth aspect of the invention which comprises applying the composition, concentrate or dilute formulation to a substrate.

Embodiments of this method include (a) a method of treating vegetation by applying to plants and/or soil a formulation according to the invention which formulation comprises a specific chemical agent which is an agrochemical, and/or (b) a method of cleaning hard surfaces which comprises applying a composition, concentrate or formulation according to the invention to a hard surface, which concentrate or formulation optionally comprises a specific chemical agent which is a metal corrosion inhibitor.

In embodiment (a) the agrochemical may be one or more growth regulators, herbicides, and/or pesticides, for example insecticides, fungicides or acaricides.

This embodiment of the method of applying the formulation according to the fifth aspect of the present invention thus includes in turn (i) a method of killing or inhibiting vegetation by applying the formulation which comprises a specific chemical agent which is one or more growth regulators and/or herbicides, and/or (ii) a method of killing or inhibiting plant pests by applying the formulation which comprises a specific chemical agent which is one or more pesticides, for example insecticides, fungicides or acaricides.

In embodiment (b), the cleaning may for example comprise decreasing and/or working metal. Such working of metal may include for example cutting or abrasion.

The compositions, concentrates and dilute formulation according to the invention are especially useful when used with alkalis or other builders.

Examples of agrochemicals which are growth regulators, herbicides, and/or pesticides, etc. within concentrates and formulations of the present invention include those of formula

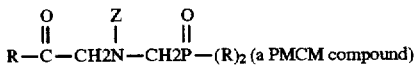 (a PMCM compound)

in which

R is selected from the group consisting of halogen, —NHOH, —N(R$^1$)2, —OR$^2$, SR$^2$ and —OM,
where
R$^1$ is independently selected from hydrogen, alkyl or hydroxyalkyl, preferably containing less than about 5 carbon atoms, alkenyl, preferably containing less than about 5 carbon atoms or phenyl moieties;
R$^2$ is independently selected from hydrogen, alkyl, hydroxyalkyl or chloroalkyl, preferably containing less than about 5 carbon atoms, alkoxy, preferably containing less than about 5 carbon atoms, alkylene amine, preferably containing less than about 12 carbon atoms, phenyl or benzyl moieties;
M is selected from hydrogen and agriculturally acceptable salt forming moieties such as alkali metal, alkaline earth metal, stannic, ammonium, organic ammonium, alkyl sulfonium, alkyl sulfoxonium, alkyl phosphonium moieties or combinations thereof; and
Z is hydrogen, an organic moiety or an inorganic moiety.

Representative patents disclosing at least some of such compounds include U.S. Pat. Nos. 3,799,758, 4,397,676, 4,140,513, 4,315,765, 3,868,407, 4,405,531, 4,481,026, 4,414,158, 4,120,689, 4,472,189, 4,341,549 and 3,948,975.

Representative patents disclosing PMCM compounds wherein Z is other than hydrogen include U.S. Pat. Nos. 3,888,915, 3,933,946, 4,062,699, 4,119,430, 4,322,239 and 4,084,954.

In preferred PMCM compounds, Z is hydrogen or an organic substituent.

Representative organic substituents include methylene carboxylic; methylene phosphonic; methylene cyano; carboxyl such as formyl, acetyl, benzoyl perfluoroacyl and thiocarbonyl; ethylene, such as cyano, carbamoyl or carboxy substituted ethyl; and benzene sulphonyl substituents.

Representative patents disclosing compounds where the nitrogen contains three organic substituents include U.S. Pat. Nos. 3,455,675, 3,556,762, 3,853,530, 3,970,695, 3,988,142, 3,991,095, 3,996,040, 4,047,927, 4,180,394, 4,203,756, 4,261,727 and 4,312,662.

A preferred tertiary nitrogen substituted PMCM compound is N,N-bis(phosphonomethyl)glycine.

Those PMCM compounds wherein Z is hydrogen are most preferred when the phytoactivity desired is herbicidal activity.

The above patents are herein incorporated by reference.

Illustrative of agriculturally acceptable salt-forming moieties represented by M, as in OM, are
the alkali metals having atomic weights of from 22 through 133, inclusive, such as sodium, potassium, or rubidium;
the alkaline earth metals having atomic weights of from 24 through 88 inclusive, such as magnesium or calcium;

ammonium and aliphatic ammonium, wherein the aliphatic is primary, secondary, tertiary or quaternary and preferably wherein the total number of carbon atoms does not exceed more than about twelve;
phenylammonium;
trialkylsulphonium, preferably wherein the total number of carbons in the three alkyl substituents does not exceed more than about six, such as trimethylsulphonium, ethyl dimethylsulphonium, propyl dimethylsulphonium and the like;
trialkylsulphoxonium, preferably wherein the total number of carbon atoms in the three alkyl substituent does not exceed more than about six, such as trimethylsulphoxonium, ethyl dimethylsulphoxonium, propyl dimethylsulfoxonium and the like;
tetraalkylphosphonium, such as tetramethylphosphonium, ethyl trimethylphosphonium, propyl trimethylphosphonium and the like.

In preferred formulations according to this invention, M is independently selected from the above-described agriculturally acceptable salt-forming moieties and hydrogen.

In more preferred formulations, M is an alkali metal, ammonium, monoalkyl ammonium or trialkylsulphonium moiety.

In most preferred formulations only one M is an alkali metal, ammonium, monoalkyl ammonium, or trialkylsulphonium moiety, while the two M's are hydrogen.

Representative most preferred formulations include isopropylamine N-phosphonomethylglycine, trimethylsulphonium N-phosphonomethylglycine and sodium sesqui-N-phosphonomethylglycine.

Combinations of two or more PMCM compounds can be employed in the formulations and processes in accordance with the invention.

Within concentrates and formulations of the present invention which comprise a corrosion inhibitor as component (e), one class of known corrosion inhibitors, suitable for practically all the relevant substrate materials which may be treated, includes straight-chain or branched alkanecarboxylic acids and water-soluble salts thereof e.g. with an alkali metal cation e.g. sodium or potassium, or an alkanolammonium cation.

Materials of this type include in particular water-soluble alkanolammonium salts of straight-chain or branched alkanecarboxylic acids which acids comprise 8 to 11 carbon atoms.

The present invention is illustrated by the following Examples

EXAMPLES

1. Compositions

The compositions shown in Table 1 were made by adding components (b) and (c) to a solution of component (a) in the stated amount of water (component (d)) with stirring and mixing until the product is homogeneous.

In the compositions shown in Table 1, the components (a), (b) and (c) are as follows:
Component
(a) HPS 1 Alkyl glucoside, average of 10 alkyl carbon atoms and 1.35 glucose residues per molecule.
HPS 2 Alkyl glucoside, average of 9 alkyl carbon atoms and 1.35 glucose residues per molecule.
(b) SURFYNOL DF-58 (TM, Air Products Nederland BV)
Polysiloxane antifoam, a polyether modified polysiloxane having a molecular weight in the range 8000 to 10000.
(c) non-ionic surfactants
TWEEN 164 (TM, Imperial Chemical Industries plc)

Sorbitan monolaurate poly(ethoxylated) with 20 mole of ethylene oxide per mole.

TERIC 164 (TM. Imperial Chemical Industries plc)
   Mixture of $C_{12}$ and $C_{15}$ alcohols poly(alkoxylated) with 6 mole ethylene oxide per mole.

ATLAS G-3780644 (TM. Imperial Chemical Industries plc)
   Poly(alkoxylated) tallow amine with 20 mole of ethylene oxide per mole.

TABLE 1

| Components | S1 | S2 | S3 | S4 |
|---|---|---|---|---|
| | \multicolumn{4}{c}{wt. of Components, g} | | | |
| (a) HPS 1 (no water) | 35.625 | 36.375 | 36.75 | 35.625 |
| (b) SURFYNOL DF-58 | 2.5 | 1.5 | 1.0 | 5.0 |
| (c) TWEEN 164 | 23.75 | 24.25 | 24.5 | 23.75 |
| TERIC 164 | 2.5 | 1.5 | 1.0 | — |
| (d) Water | 35.625 | 36.375 | 36.75 | 35.625 |

| Components | S5 | S6 | S7 | S8 |
|---|---|---|---|---|
| | wt. of Components, g | | | |
| (a) HPS 1 (no water) | 37.125 | 37.31 | 36.75 | 37.31 |
| (b) SURFYNOL DF-58 | 1.0 | 0.25 | 2.0 | 0.5 |
| (c) TWEEN 164 | 24.75 | 24.87 | 24.5 | 24.87 |
| TERIC 164 | — | 0.25 | — | — |
| (d) Water | 37.125 | 37.31 | 36.75 | 37.31 |

| Components | S9 | S10 | S11 | S13 |
|---|---|---|---|---|
| | wt. of Components, g | | | |
| (a) HPS 2 (no water) | 71.25 | 65.8 | 63.84 | 70.9 |
| (b) SURFYNOL DF-58 | 0.05 | 0.5 | 2.0 | 0.25 |
| (c) TERIC 164 | 0.05 | 0.5 | 2.0 | 0.25 |
| ATLAS G-3780 | 4.95 | 4.985 | 4.8 | 4.9 |
| (d) Water | 23.7 | 28.215 | 27.36 | 23.7 |

2. Concentrates and Dilute Formulations

A. Pesticidal concentrates and formulations

The concentrates shown in Table 2 were made by adding the components to the stated amount of water with stirring and mixing until the product is homogeneous.

In the concentrates shown in Table 2. TSPMG is Trimethyl sulphonium phosphono methyl-glycine solution in water (52.2% w/w).

Each concentrate C1, C2 and C3 was also diluted to 1× w/v dilution (i.e. weight in grams per ml.) by mixing it with World Health Organisation Standard hard water (342 ppm hardness) (WHO water) water to form the formulations F1, F2 and F3 respectively.

TABLE 2

| Concentrate Number Components | C1 | C2 | C3 |
|---|---|---|---|
| | wt. of Components, g | | |
| TSPMG (in water) | 747.0 | 747.0 | 747.0 |
| Composition S13 | | 240.0 | |
| Composition S10 | | | 240.0 |
| Composition S13 without SURFYNOL | 240.0 | | |
| Water | 148.0 | 148.0 | 148.0 |

3. Non Pesticidal Formulations

The HPS blend HPS 1 without the siloxane SURFYNOL DF-58, and Compositions S2, S3 and S5 were diluted to 1% w/v dilutions in WHO water and mixed until the product was homogeneous, giving Formulations F7, F8, F9 and F10 respectively.

TEST METHOD AND TEST RESULTS

1. Test Method 50 ml of the formulation is poured into a 125 ml glass bottle.

The formulation is shaken for 5 minutes 600 times per min. using an oscillatory shaker (Prolabo Oscill 8).

After this 5 minutes of shaking, the foam height is measured and expressed in mm (=FH).

The time necessary for the foam to disappear till only 5 mm of foam is left on top of the liquid surface is also measured. This is the collapse time (=CT).

As a third measurement, the time is noted for the first open liquid surface to appear. This is the break time (=BT).

2. Test Results

Test 1
Defoaming performance of C1, C2, C3, F1, F2 and F3 shaken one day after preparation.

| Formulation/ Concentrate | FH (mm) | CT (sec) | BT (sec) |
|---|---|---|---|
| C1 | 35 | Stable | Stable |
| C2 | 1NA(1) | 25 | |
| C3 | 1 | NA (1) | 25 |
| F1 | 1 | Stable | Stable |
| F2 | 5 | NA (1) | NA (2) |
| F3 | 4 | NA (1) | NA (2) |

(1) NA: not applicable: foam height is already at or below 5 mm.
(2) NA: not applicable: the foam disappeared so fast it is practically impossible to put an exact number on it.

Test 2
Defoaming performance when shaken after one month's storage at room temperature (20–25° C.)

| Formulation/ Concentrate | FH (mm) | CT (sec) | BT (sec) |
|---|---|---|---|
| C1 | 30 | Stable | Stable |
| C2 | 3 | NA (1) | 30 |
| C3 | 0 | NA | NA |
| F1 | 30 | Stable | Stable |
| F2 | 3 | NA (1) | 20 |
| F3 | 2 | NA (1) | 10 |

(1) NA: not applicable: foam height is already at or below 5 mm.
(2) NA: not applicable: the foam disappeared so fast it is practically impossible to put an exact number on it.

Test 3
Defoaming performance when shaken after one month's storage at 40° C.

| Formulation/ Concentrate | FH (mm) | CT (sec) | BT (sec) |
|---|---|---|---|
| C1 | 30 | Stable | Stable |
| C2 | 2 | NA (1) | 40 |
| C3 | 0 | NA (1) | NA |
| F1 | 27 | Stable | Stable |

Test 3
Defoaming performance when shaken after one month's storage at 40° C.

| Formulation/Concentrate | FH (mm) | CT (sec) | BT (sec) |
|---|---|---|---|
| F2 | 7 | 3 | 30 |
| F3 | 5 | NA (1) | 15 |

(1) NA: not applicable: foam height is already at or below 5 mm.
(2) NA: not applicable: the foam disappeared so fast it is practically impossible to put an exact number on it.

Test 4
Defoaming performance when shaken after three months storage at room temperature (20–25° C.)

| Formulation/Concentrate | FH (mm) | CT (sec) | BT (sec) |
|---|---|---|---|
| C1 | 31 | Stable | Stable |
| C2 | 2 | NA (1) | NA (2) |
| C3 | 3 | NA (1) | 10 |
| F1 | 27 | Stable | Stable |
| F2 | 5 | NA (1) | 20 |
| F3 | 3 | NA (1) | 15 |

(1) NA: not applicable: foam height is already at or below 5 mm.
(2) NA: not applicable: the foam disappeared so fast it is practically impossible to put an exact number on it.

Test 5
Defoaming performance after 10 days storage at room temperature (20–25° C).

| Formulation/Concentrate | FH (mm) | CT (sec) | BT (sec) |
|---|---|---|---|
| F7 | 35 | Stable | Stable |
| F8 | 2 | NA (1) | 5 |
| F9 | 2 | NA (1) | 10 |
| F10 | 0 | NA (1) | NA |

(1) NA: not applicable: foam height is already at or below 5 mm.

Test 6
Defoaming performance when shaken after 10 days storage at 40° C.

| Formulation/Concentrate | FH (mm) | CT (sec) | BT (sec) |
|---|---|---|---|
| F7 | 35 | Stable | Stable |
| F8 | 7 | 30 | 90 |
| F9 | 5 | NA (1) | 55 |
| F10 | 4 | NA (1) | 15 |

(1) NA: not applicable: foam height is already at or below 5 mm.

We claim:

1. A composition which is a homogenous solution which comprises
   a) a hydrocarbyl polysaccharide;
   b) an antifoam component comprising a siloxane antifoam agent;
   c) at least one other non-ionic surfactant; and
   d) a solvent for the hydrocarbyl polysaccharide,
   such that the antifoam component forms a separate phase on dilution with water;
   components (a) and (c) being present in a weight ratio within the range 20:1 to 1:3;
   the amount of component (b) being from 0.1 to 10% by weight of the combined weight of components (a) and (b); and
   the amount of component (d) being from 25 to 100% by weight of the combined weight of components (a), (b) and (c).

2. A composition as claimed in claim 1, wherein the hydrocarbyl polysaccharide is at least one compound of the formula: $R.OG_a$ where
   R is an optionally substituted hydrocarbyl group;
   G is a saccharide residue; and
   a is an average value which is at least 1.

3. A composition as claimed in claim 2 in which the saccharide residue G is derived from fructose, glucose, mannose, galactose, telose, gulose, allose, altrose, idose, arabinose, xylose, lyxose and/or ribose.

4. A composition as claimed in any one of claim 1, wherein the hydrocarbyl polysaccharide is at least one alkyl glucoside of the formula:

$$C_nH_{(2n+1)}.(C_6H_{10}O_5)_b.H$$

where n has the value of 8 to 14, and b has the value of greater than one and not more than two.

5. A composition as claimed in claim 1, wherein the antifoam component is a polysiloxane antifoam agent of the formula:

$$R^a{}_3.SiO.[SiOR^aR^b]_{n'}.SiR^a{}_3$$

in which the groups $R^a$ are individually alkyl groups and one or more of the groups $R^b$ may be residues of polyalkylene glycols and the others are as defined for $R^a$, and n' is such that that the polysiloxane has a molecular weight in the range 1000 to 20000.

6. A composition as claimed in claim 1, wherein the at least one other non-ionic surfactant is or includes a non-ionic surfactant is of the formula:

$$R^1.O(X).R^2 \text{ and/or } R^3-N(XH)_2$$

in which
   $R^1$ is an alkyl group having 12 to 15 carbon atoms, or a sorbitan group,
   $R^2$ is hydrogen, an alkyl group, having 1 to 4 carbon atoms, or a carboxymethyl group or a salt thereof, or a fatty acid residue having 10 to 22 carbon atoms,
   X is a polyalkylene oxide group containing an average of 3 to 30 alkylene oxide groups, or mixed alkylene oxide groups, containing 2 to 25 alkylene oxide groups, and
   $R^3$ is an alkyl or alkenyl group having 16 to 18 carbon atoms.

7. A composition as claimed in claim 1 which additionally includes e) a metal corrosion inhibitor.

8. A metal working concentrate comprising a homogenous solution of a composition as claimed in claim 1, and e) a metal corrosion inhibitor.

9. A dilute formulation which is a mixture of a concentrate as claimed in claim 8, with 10 to 10,000 times the total weight of the components (a) to (d) of water.

10. A method of using a surfactant composition as claimed in claim 7, a metal working concentrate as claimed in claim 8, or a dilute formulation as claimed in claim 9 which comprises applying the surfactant composition, concentrate or dilute formulation onto a metal surface which is being cut or worked.

11. A method of cleaning a hard surface which comprises applying a composition as claimed in either claim 1 or claim 7, a concentrate as claimed in claim 8, or a dilute formulation as claimed in claim 9, which optionally comprises an alkali, to a hard surface.

12. A composition as claimed in claim 1 which additionally includes e) an agrochemical.

13. A composition as claimed in claim 12 where the agrochemical is a plant growth regulator, a herbicide, or a pesticide, an acaricide, a fungicide or a mixture of these.

14. A composition as claimed in claim 12 wherein the agrochemical is one or more phosphonomethyl-n-carboxymethyl herbicides of the formula:

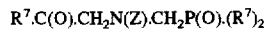

where each $R^7$ is independently halogen, —NHOH, —N($R^8$)$_2$, —OR$^9$, —SR$^9$ or —OM, where $R^8$ is independently a hydrogen, or alkyl or hydroxyalkyl, alkenyl or phenyl;

each $R^9$ is independently hydrogen, alkyl, hydroxyalkyl or chloroalkyl, alkoxy, alkylene amine, phenyl or benzyl;

M is hydrogen or an agriculturally acceptable salt forming moieties selected from the group consisting of alkaline earth metal, stannic, ammonium, organic ammonium, alkyl sulfonium, alkyl sulfoxonium, alkyl phosphonium moieties and combinations thereof; and Z is hydrogen, an organic moiety or an inorganic moiety.

15. An agrochemical concentrate comprising a homogenous solution of a composition as claimed in claim 1, and e) an agrochemical.

16. A concentrate as claimed in claim 15 where the agrochemical is a plant growth regulator, a herbicide, or a pesticide, an acaricide, a fungicide or a mixture of these.

17. A concentrate as claimed in claim 15 wherein the agrochemical is one or more phosphonomethyl-n-carboxymethyl herbicides of the formula:

where each $R^7$ is independently halogen, —NHOH, —N(R)$_2$, —OR$^9$, —SR$^9$ or —OM, where $R^8$ is independently a hydrogen, or alkyl or hydroxyalkyl, alkenyl or phenyl;

each $R^9$ is independently hydrogen, alkyl, hydroxyalkyl or chloroalkyl, alkoxy, alkylene amine, phenyl or benzyl;

M is hydrogen or an agriculturally acceptable salt forming moieties selected from the group consisting of alkaline earth metal, stannic, ammonium, organic ammonium, alkyl sulfonium, alkyl sulfoxonium, alkyl phosphonium moieties and combinations thereof, and Z is hydrogen, an organic moiety or an inorganic moiety.

18. A dilute formulation which is a mixture of a composition as claimed in claim 1 with 10 to 10,000 times the total weight of the components (a) to (d) of water.

19. A dilute formulation which is a mixture of a composition as claimed in claim 15 with 10 to 10,000 times the total weight of the components (a) to (d) of water.

20. A dilute formulation which is a mixture of a composition as claimed in claim 16 with 10 to 10,000 times the total weight of the components (a) to (d) of water.

21. A dilute formulation which is a mixture of a composition as claimed in claim 17 with 10 to 10,000 times the total weight of the components (a) to (d) of water.

22. A method of treating vegetation which comprises applying to plants and/or soil a composition as claimed in claim 12.

23. A method of treating vegetation which comprises applying to plants and/or soil a composition as claimed in claim 14.

24. A method of treating vegetation which comprises applying to plants and/or soil a diluted formulation composition as claimed in claim 19.

25. A method of treating vegetation which comprises applying to plants and/or soil a diluted formulation composition as claimed in claim 20.

26. A method of treating vegetation which comprises applying to plants and/or soil a diluted formulation composition as claimed in claim 21.

* * * * *

UNITED STATES PATENT AND TRADEMARK OFFICE
CERTIFICATE OF CORRECTION

PATENT NO. : 5,750,513
DATED : May 12, 1998
INVENTOR(S) : Hoorne, et al.

It is certified that error appears in the above-identified patent and that said Letters Patent is hereby corrected as shown below:

In The Title
Before "Hydrocarbyl", insert --Low Foam--.

Related U.S. Application Data
Continuation of PCT application Serial No. PCT/GB93/02351 filed on November 16, 1993, which PCT application designated the U.S.

Foreign Application Priority Data
December 1, 1992 [GB] United Kingdom 9225075.2

Signed and Sealed this

Thirteenth Day of June, 2000

Attest:

Q. TODD DICKINSON

Attesting Officer         Director of Patents and Trademarks